(12) United States Patent
Quint et al.

(10) Patent No.: US 12,117,304 B2
(45) Date of Patent: Oct. 15, 2024

(54) ELECTRIC VEHICLE TRIP PLANNER

(71) Applicant: Rivian IP Holdings, LLC, Plymouth, MI (US)

(72) Inventors: Jason Meyer Quint, Ann Arbor, MI (US); Kok Wei Koh, Mountain View, CA (US); Sara Eslinger, Redwood City, CA (US); Murat Erozlu, North Vancouver (CA); Anmol Garg, San Francisco, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 7 days.

(21) Appl. No.: 17/379,710

(22) Filed: Jul. 19, 2021

(65) Prior Publication Data

US 2023/0015682 A1    Jan. 19, 2023

(51) Int. Cl.
 *B60L 53/62* (2019.01)
 *G01C 21/34* (2006.01)
 *G01C 21/36* (2006.01)
 *B60L 53/63* (2019.01)

(52) U.S. Cl.
 CPC ..... *G01C 21/3484* (2013.01); *G01C 21/3476* (2013.01); *G01C 21/3682* (2013.01); *G01C 21/3694* (2013.01); *B60L 53/62* (2019.02); *B60L 53/63* (2019.02)

(58) Field of Classification Search
 None
 See application file for complete search history.

(56) References Cited

U.S. PATENT DOCUMENTS

| | | | | |
|---|---|---|---|---|
| 2014/0165159 A1* | 6/2014 | Baade | ...................... | H04L 63/08 |
| | | | | 726/4 |
| 2014/0172292 A1* | 6/2014 | McGee | .............. | G01C 21/3605 |
| | | | | 701/418 |
| 2014/0288832 A1* | 9/2014 | Hoch | .................. | G01C 21/3469 |
| | | | | 701/538 |
| 2015/0160029 A1* | 6/2015 | Kobayashi | ....... | G08G 1/096816 |
| | | | | 701/32.3 |
| 2015/0306969 A1* | 10/2015 | Sabripour | ............... | H02J 3/322 |
| | | | | 320/109 |
| 2017/0352082 A1* | 12/2017 | Aziz | ...................... | G06Q 50/40 |

(Continued)

FOREIGN PATENT DOCUMENTS

| | | | |
|---|---|---|---|
| DE | 102016209753 A1 | * | 6/2017 |
| JP | 2011237186 A | * | 11/2011 |
| KR | 20210006768 A | * | 1/2021 |

OTHER PUBLICATIONS

English translation of Hashimoto from J-PlatPat. (Year: 2011).*

(Continued)

*Primary Examiner* — Aryan E Weisenfeld
*Assistant Examiner* — Jeffrey R Chalhoub
(74) *Attorney, Agent, or Firm* — Haley Guiliano LLP

(57) ABSTRACT

Systems and methods are provided for suggesting a charging station for an electric vehicle. A destination of the electric vehicle is determined, and a schedule of a user of the electric vehicle is accessed. An event scheduled during a travel period to reach the destination is identified in the schedule of the user, and a suggested charging station is selected based at least on the destination and the identified scheduled event. The suggested charging station is generated for presentation at a display.

21 Claims, 13 Drawing Sheets

(56) References Cited

U.S. PATENT DOCUMENTS

2018/0322775 A1* 11/2018 Chase .................. G06F 15/76
2019/0324600 A1* 10/2019 Wipperfürth .......... H04W 4/48
2020/0284599 A1*  9/2020 Cyr ................... G01C 21/3469

OTHER PUBLICATIONS

English translation of Choi from PE2E Search. (Year: 2021).*
A Better Routeplanner, https://abetterrouteplanner.com/ (retrieved on Jun. 15, 2022).
Charge Trip, https://chargetrip.com/ (retrieved on Jun. 15, 2022).
Tesla's Trip Planner, https://tesla.com/trips (retrieved on Jun. 15, 2022).

* cited by examiner

| Jorden's Schedule | Today |
|---|---|
| 12:00 PM | |
| 12:30 PM | |
| 1:00 PM | |
| 1:30 PM | Zoom Call With Work (1:45PM-2:10PM) — 302 |
| 2:00 PM | |
| 2:30 PM | |
| 3:00 PM | Call Doctor (3:00 PM) — 304 |
| 3:30 PM | |
| 4:00 PM | |
| 4:30 PM | |
| 5:00 PM | |
| 5:30 PM | |
| ... | |
| 8:30 PM | Dinner at Boyne Highlands Resort (8:30 PM) — 306 |

ELECTRIC VEHICLE TRIP PLANNER

INTRODUCTION

Many electric vehicles include a battery that must be charged periodically at a charging station to enable the battery to power the electric vehicle. As the popularity of electric vehicles continues to grow, more and more charging stations are being built to accommodate such charging of electric vehicles. However, it may be difficult for a driver of an electric vehicle to identify a suitable electric charging station for his or her electric vehicle while traveling to a driving destination from among such a multitude of options. In one approach, a navigation interface is presented to the driver of an electric vehicle suggesting one or more charging stations along a route to a destination based on, e.g., the remaining range of the electric vehicle, the proximity of the charging station to the route, etc.

SUMMARY

However, in such an approach, charging stations are not suggested based on a schedule of an occupant of the electric vehicle (e.g., the driver) or times when an occupant of the electric vehicle is projected to need to make a stop along the route to a destination (e.g., unrelated to the remaining range of the electric vehicle). Accordingly, the electric vehicle may be required to make multiple stops en route to a destination. Additionally, because stopping to charge an electric vehicle may take longer than the time required to refuel a gas-powered car, travel time to a destination may be significantly increased. Consequently, what is needed are techniques to provide drivers of electric vehicles with suggestions for charging stations at times when the driver is likely to stop, so as to minimize unnecessary stops when traveling to a destination.

To solve one or more of these problems, systems and methods are provided to improve suggestions of charging stations along a route to a destination by analyzing a schedule of an occupant of the electric vehicle (e.g., the driver) to identify events for which the driver is likely to stop (e.g., a video call) and suggesting charging stations at locations where the driver is likely to stop the electric vehicle, based on the identified events. By suggesting charging stations at locations where the driver is already likely to stop, unnecessary stops may be avoided. For example, if the driver has a scheduled video call, a charging station at a location where the electric vehicle is projected to be at the start of the video call may be suggested so that the driver can charge the electric vehicle while participating in the video call.

In accordance with the present disclosure, systems and methods are provided for suggesting a charging station for an electric vehicle, and may comprise a display and processing circuitry configured to determine a destination, access a schedule of a user of the electric vehicle, identify, in the schedule of the user, an event scheduled during a travel period to reach the destination, select a suggested charging station based at least on the destination and the identified scheduled event, and generate for presentation, at the display, the suggested charging station.

In some embodiments, the processing circuitry may be configured to select the suggested charging station by estimating a location of the electric vehicle along a route to the destination at a start time of the identified scheduled event, and selecting the suggested charging station based on the estimated location.

In some embodiments, the processing circuitry may be configured to select the suggested charging station based on one or more of a charge state of the electric vehicle, a duration of the identified scheduled event, or charging attributes of available charging stations.

In some embodiments, the processing circuitry may be further configured to access a profile of the user, predict a location along a route to the destination where the user is likely to stop based on the profile of the user, select a second suggested charging station based on the predicted location, and generate for presentation, at the display, the second suggested charging station.

In some embodiments, the processing circuitry may be configured to access a weather forecast and identify inclement weather at a location of the suggested charging station based on the weather forecast. In response to identifying the inclement weather at the location of the suggested charging station, the processing circuitry may be configured to select an alternative suggested charging station based on the weather forecast, and generate for presentation, at the display, the alternative suggested charging station.

In some embodiments, the processing circuitry may be configured to receive a waypoint input from the user, select a second suggested charging station based on the waypoint, and generate for presentation, at the display, the second suggested charging station.

In some embodiments, the processing circuitry may be configured to receive a request to replace the suggested charging station, and in response to receiving the request to replace the suggested charging station, select an alternative suggested charging station along a route to the destination, and generate for presentation, at the display, the alternative suggested charging station.

In some embodiments, the processing circuitry may be configured to access a profile of the user, identify driving habits of the user based on the profile of the user, access a traffic report along a route to the destination, and estimate the travel period to reach the destination based on the driving habits of the user and the traffic report.

In some embodiments, the processing circuitry may be configured to determine the destination by identifying, in the schedule of a user, a second scheduled event, determining a location associated with the second scheduled event, and determining the location associated with the second scheduled event as the destination.

In some embodiments, the processing circuitry may be configured to generate for presentation, at the display, the suggested charging station by generating for presentation, at the display, an overlay on a map interface, the overlay including the suggested charging station.

In some embodiments, a non-transitory computer-readable medium is provided having non-transitory computer-readable instructions encoded thereon that, when executed by a processor, cause the processor to determine a destination, access a schedule of a user of an electric vehicle, identify an event scheduled during a travel period to reach the destination, select a suggested charging station based at least on the destination and the identified scheduled event, and generate for presentation, at a display, the suggested charging station.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 3 shows exemplary calendar data of a driver of the electric vehicle, in accordance with some embodiments of the present disclosure;

DETAILED DESCRIPTION

Figure 1:
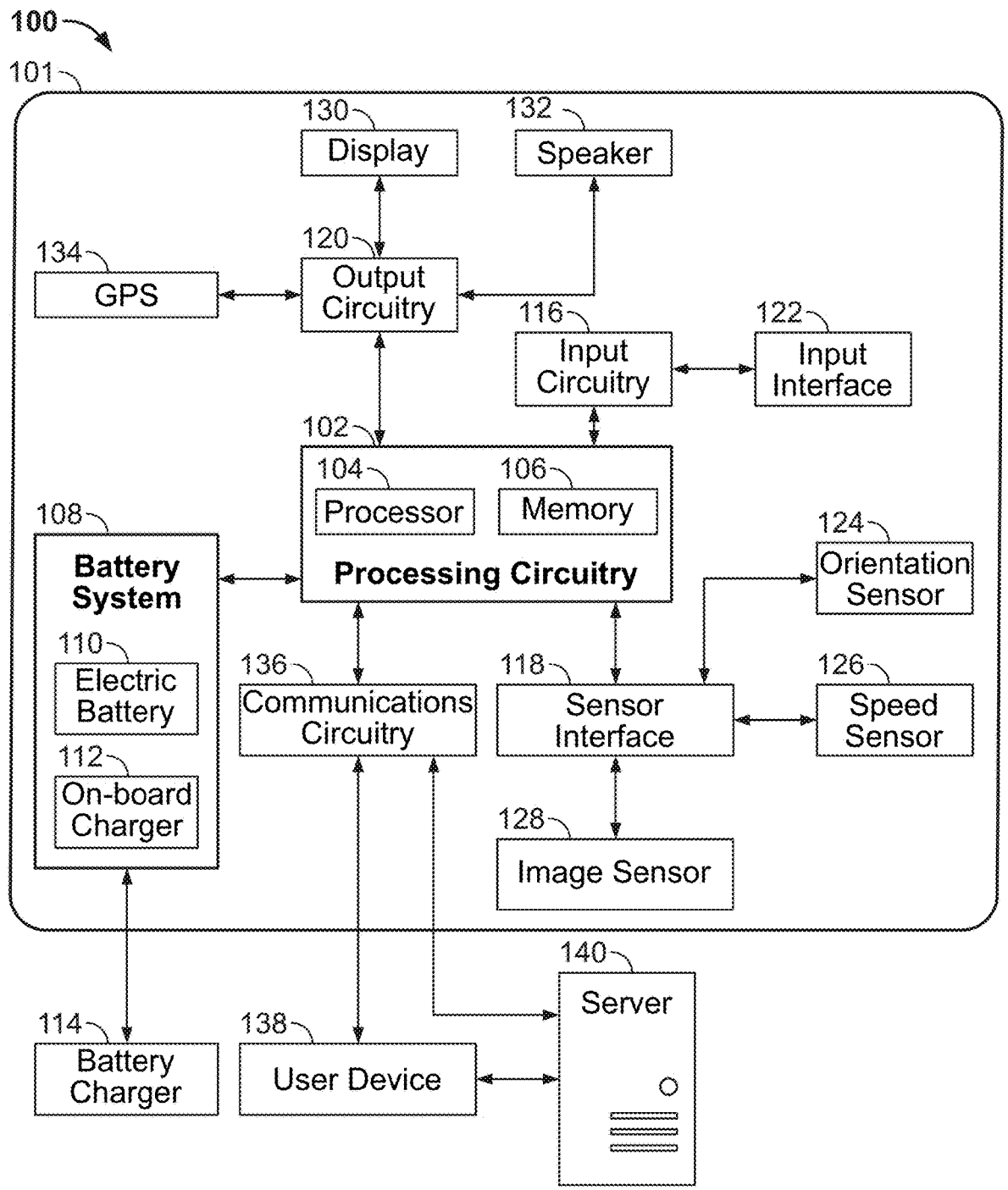
FIG. 1 shows a block diagram of components of a system of an electric vehicle for providing, to a driver of the electric vehicle, suggested charging stations for recharging the electric vehicle on a route to a destination, in accordance with some embodiments of the present disclosure.

FIG. 1 shows a block diagram of components of a system 100 of electric vehicle 101 for providing, to an occupant of electric vehicle 101 (e.g., the driver), suggested charging stations for recharging electric vehicle 101 on a route to a destination, in accordance with some embodiments of the present disclosure. Electric vehicle 101 may be a car (e.g., a coupe, a sedan, a truck, an SUV, a bus), a motorcycle, an aircraft (e.g., a drone), a watercraft (e.g., a boat), or any other type of vehicle.

Electric vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of electric vehicle 101. In some embodiments, processor 104 alone may be referred to as processing circuitry 102 of electric vehicle 101. Memory 106 may comprise hardware elements for non-transitory storage of commands or instructions, that, when executed by processor 104, cause processor 104 to operate electric vehicle 101 in accordance with embodiments described above and below. Processing circuitry 102 may be communicatively connected to components of electric vehicle 101 via one or more wires, or via wireless connection.

Processing circuitry 102 may be communicatively connected to battery system 108, which may be configured to provide power to one or more of the components of electric vehicle 101 during operation. In some embodiments, electric vehicle 101 may be an electric vehicle or a hybrid electric vehicle. Battery system 108 may comprise electric battery 110, which may include one or more battery modules. In some embodiments, electric battery 110 may be a 180 kWh battery pack or a 135 kWh battery pack. Battery system 108 may further comprise on-board charger 112 to manage the flow of electricity to electric battery 110 (e.g., to perform AC-DC conversion when battery charger 114 is an AC charger), and any other suitable components. In some embodiments, on-board charger 112 may include connectors for interfacing with battery charger 114. Battery system 108 may be configured to manage charging of battery 110, which may include measuring one or more characteristics of battery 110, identifying if a fault has occurred, providing power to components of electric vehicle 101, communicating with battery charger 114, any other suitable actions, or any combination thereof. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 108 may provide charge status information to processing circuitry 102. Charge status information includes, for example, charge level, whether the battery is being charged, charging current, charging voltage, charging mode, and whether a charging fault exists.

In some embodiments, electric vehicle 101 may be plugged, or otherwise connected to, battery charger 114 via a cable (e.g., having a SAE J1772 charging plug, a CCS connector, etc.), having more than one conductor of suitable gauge. Such cable may include conductors for carrying charging current and conductors for transmitting information. It will be understood that any suitable arrangement of leads may be used in accordance with the present disclosure.

Battery charger 114 may be coupled to a power source, e.g., a power transmission grid, a solar panel, a generator, a wind turbine, or another vehicle, and may be configured to provide charging current at a suitable charging voltage to electric battery 110 of electric vehicle 101. In some embodiments, battery charger 114 may correspond to a charger at a DC station (e.g., DC fast electric charging station) or AC station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging electric battery 110 at one or more voltages, with one or more current limitations. For example, battery charger 114 may receive information from battery system 108 indicating what voltage, current, or both, electric vehicle 101 may be charged with.

Battery charger 114 may provide a charging current that is limited by one or more constraints. For example, electric vehicle 101 may communicate to battery charger 114 what charging current is desired for charging. In a further example, a cable type may have a maximum associated current capacity based on insulation and heat transfer considerations. In some embodiments, battery charger 114 and on-board charger 112, support both the inflow and outflow of current from electric battery 110 via a coupling. For example, during vehicle to vehicle charging or vehicle to grid power supply, battery charger 114 and/or on-board charger 112 may direct power from electric battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of electric vehicle 101. In some embodiments, image sensor 128 may capture images of destinations traveled to by electric vehicle 101 to identify driving habits of electric vehicle 101. Processing circuitry 102 may be communicatively connected to input interface 122 (e.g., a steering wheel, a touch screen display, buttons, knobs, a microphone or other audio capture device, etc.) via input circuitry 116. In some embodiments, a driver of electric vehicle 101 may be permitted to select certain settings in connection with the operation of electric vehicle 101 (e.g., input a range selection, etc.). In some embodiments, processing circuitry 102 may be communicatively connected to Global Positioning System (GPS) system 134 of electric vehicle 101, where the driver may interact with the GPS system via input interface 122. GPS system 134 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 uses the determined location to identify whether the vehicle is within a threshold range of a tagged location (e.g., is within a certain range from a charging station). In some embodiments, battery system 108 may utilize the determined location to identify whether battery charger 114 is a home charging station or a non-home charging station (e.g., a public charging station, another vehicle, a generator, etc.).

Processing circuitry 102 may be communicatively connected to display 130 and speaker 132 by way of output circuitry 120. Display 130 may be located at a dashboard of electric vehicle 101 and/or a heads-up display at a windshield of electric vehicle 101. For example, an interface for GPS system 134 or an interface of an infotainment system may be generated for display, and display 130 may comprise an LCD display, an OLED display, an LED display, or any other type of display. In some embodiments, display 130 may provide a driver with intermediate charging range information and estimated charge time information based on information output by battery system 108. Speaker 132 may be located at any location within the cabin of electric vehicle 101, e.g., at the dashboard of electric vehicle 101, on an interior portion of the vehicle door. In some embodiments, speaker 132 may be configured to provide audio alerts related to intermediate charging range information and estimated charge time information based on information output by battery system 108.

Processing circuitry 102 may be communicatively connected (e.g., by way of sensor interface 118) to orientation sensor 124, which may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 126 may be one of a speedometer, a GPS sensor, or the like, or any combination thereof, and may be configured to provide a reading of the vehicle's current speed to processing circuitry 102.

In some embodiments, processing circuitry 102 may be in communication (e.g., via communications circuitry 136) with user device 138 (e.g., a mobile device, a computer, a key fob, etc.). Such connection may be wired or wireless. In some embodiments, user device 138 may execute instructions stored in memory to run a map interface application, e.g., to provide information related to electric charging stations for charging electric vehicle 101. In some embodiments, communications circuitry and/or user device 138 may be in communication with one or more servers 140 (e.g., over a communications network such as, for example, the Internet), which may be configured to provide information related to electric charging stations and/or mapping or GPS information to electric vehicle 101 and/or user device 138, and provide an updated display based on user inputs.

It should be appreciated that FIG. 1 only shows some of the components of electric vehicle 101, and it will be understood that electric vehicle 101 also includes other elements commonly found in vehicles (e.g., electric vehicles), e.g., a motor, brakes, wheels, wheel controls, turn signals, windows, doors, etc.

Figure 2:
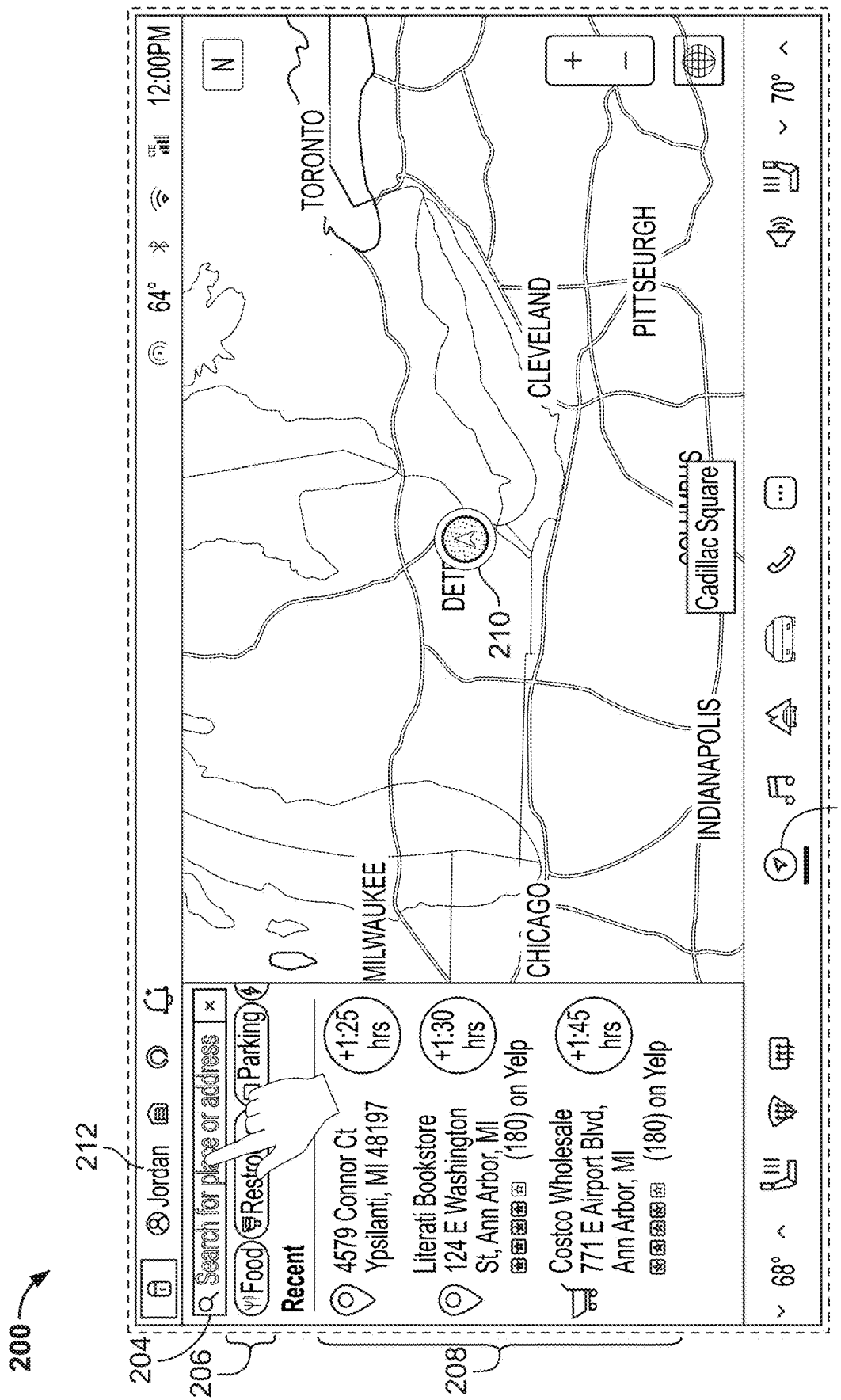
FIG. 2 shows an exemplary navigation interface for entering a desired destination, in accordance with some embodiments of the present disclosure.

FIG. 2 shows an exemplary navigation interface 200 for entering a desired destination, in accordance with some embodiments of the present disclosure. Navigation interface 200 may be generated for display, by way of processing circuitry 102 and output circuitry 120, at an in-vehicle infotainment screen of display 130 (e.g., a heads-up display and/or at one or more dashboard displays depicting graphical user interfaces) and/or at a display of user device 138 of an occupant of electric vehicle 101 (e.g., driver 212). In some embodiments, navigation interface 200 may be displayed in response to receiving a selection of icon 202 from a different interface screen. Search bar 204 may be selected by the occupant of the vehicle (e.g., driver 212) to toggle a keyboard for entering a destination, as shown in greater detail in FIG. 4. In some embodiments, an occupant of the vehicle may search for a destination using a voice input.

In some embodiments, navigation interface 200 may display user-selectable icons 206 for one or more categories (e.g., food, restrooms, parking, charging). In response to user selection of one of user-selectable icons 206, navigation interface 200 may present icons corresponding to identified locations of destinations corresponding to the selected category that are each selectable as the desired destination. For example, in response to a user selecting icon 206 for "Food," navigation interface 200 may display icons representing establishments serving food in an area around a current location of electric vehicle 101, shown by indicator 210 on navigation interface 200. In response to user selection of an icon representing a specific food establishment, navigation interface 200 may generate a route to the selected destination, as explained in further detail below.

In some embodiments, navigation interface 200 may display user-selectable icons 208 for one or more recent destinations of driver 212 (or electric vehicle 101). In response to a user selection of one of user-selectable icons 208, navigation interface 200 may generate and display a route to the selected destination.

In some embodiments, it may be advantageous to predict a destination that driver 212 is likely to travel to by analyzing a schedule of driver 212 to identify a possible destination to be displayed on navigation interface 200 as a suggested destination. In some embodiments, processing circuitry 102 may retrieve a schedule of driver 212 from user device 138 (e.g., via communications circuitry 136), as explained in further detail below with reference to FIG. 3. In some embodiments, the schedule may be a schedule associated with the electric vehicle 101 (e.g., that is populated by occupants of electric vehicle 101 or an operator/owner of electric vehicle 101).

FIG. 3 shows exemplary calendar data 300 of driver 212, in accordance with some embodiments of the present disclosure. Processing circuitry 102 may identify driver 212 of electric vehicle 101 using information obtained for a device associated with driver 212 (e.g., user device 138, a smartwatch, a smartphone, a key FOB, etc.), using cameras or facial recognition techniques, or other information techniques. For example, in some embodiments, driver 212 may select their user profile when they enter electric vehicle 101 or before they search for a destination. Based on the identity of driver 212, processing circuitry 102 may retrieve a calendar of the user (e.g., calendar data 300). In some embodiments, calendar data 300 may be stored in a user profile stored on one or more servers 140.

In some embodiments, in order to reduce processing and data transmission, calendar data 300 retrieved by processing circuitry 102 may only include data for a limited period of time (e.g., the rest of the day). For example, as shown, calendar data 300 only includes data from the current time (i.e., 12:00 PM) through the remainder of the day. In some embodiments, if multiple occupants of electric vehicle 101 are identified, processing circuitry 102 may obtain calendar data for each of the identified occupants.

Processing circuitry 102 may analyze calendar data 300 to identify events scheduled in the calendar (e.g., schedule) of driver 212. For example, as shown, processing circuitry 102 may identify first event 302 ("Zoom call with work: 1:45 PM-2:10 PM"), second event 304 ("Call doctor: 3:00 PM"), and third event 306 ("Dinner at Boyne Highlands Resort: 8:30 PM"). In some embodiments, processing circuitry 102 may determine if any of the scheduled events are associated with a location that is a likely driving destination. For example, processing circuitry 102 may identify "Boyne Highlands Resort" (e.g., a location associated with third event 306) as a possible destination to display as a suggestion to driver 212 (e.g., on navigation interface 200). In some embodiments, it may be advantageous to automatically select a likely driving destination as the destination and display a suggested route to the destination without user input.

Figure 4:
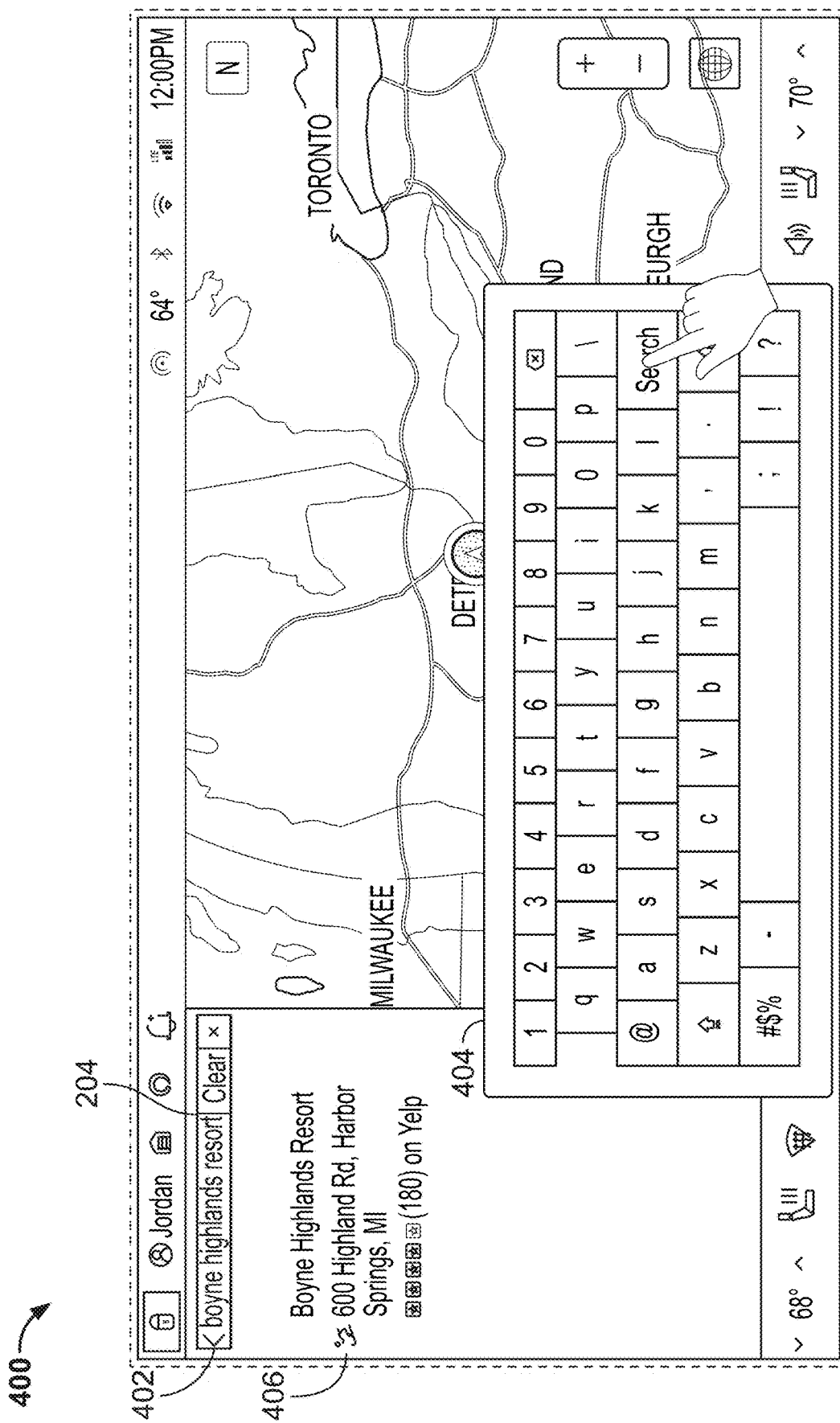
FIG. 4 shows an exemplary search interface for entering a desired destination, in accordance with some embodiments of the present disclosure.

Returning to FIG. 2, in response to a user selection of search bar 204, search interface 400 may be generated for display, by way of processing circuitry 102 and output circuitry 120, at an in-vehicle infotainment screen of display 130 (e.g., a heads-up display and/or at one or more dashboard displays depicting graphical user interfaces) and/or at a display of user device 138 of driver 212 of electric vehicle 101, as shown in FIG. 4.

FIG. 4 shows an exemplary search interface 400 for entering a desired destination, in accordance with some embodiments of the present disclosure. As shown, a user may enter search query 402 ("boyne highlands resort") in search bar 204, using displayed keyboard 404. In response to the search input, processing circuitry 102 may identify a destination 406 ("600 Highland Rd, Harbor Springs, MI") corresponding to the search input and display the identified destination 406 on search interface 400. Automatically or in response to a user selection of destination icon 406, navigation interface 500 may be generated for display, by way of processing circuitry 102 and output circuitry 120, at an in-vehicle infotainment screen of display 130 (e.g., a heads-up display and/or at one or more dashboard displays depicting graphical user interfaces) and/or at a display of user device 138 of driver 212 of electric vehicle 101, as shown in FIG. 5.

Figure 5:
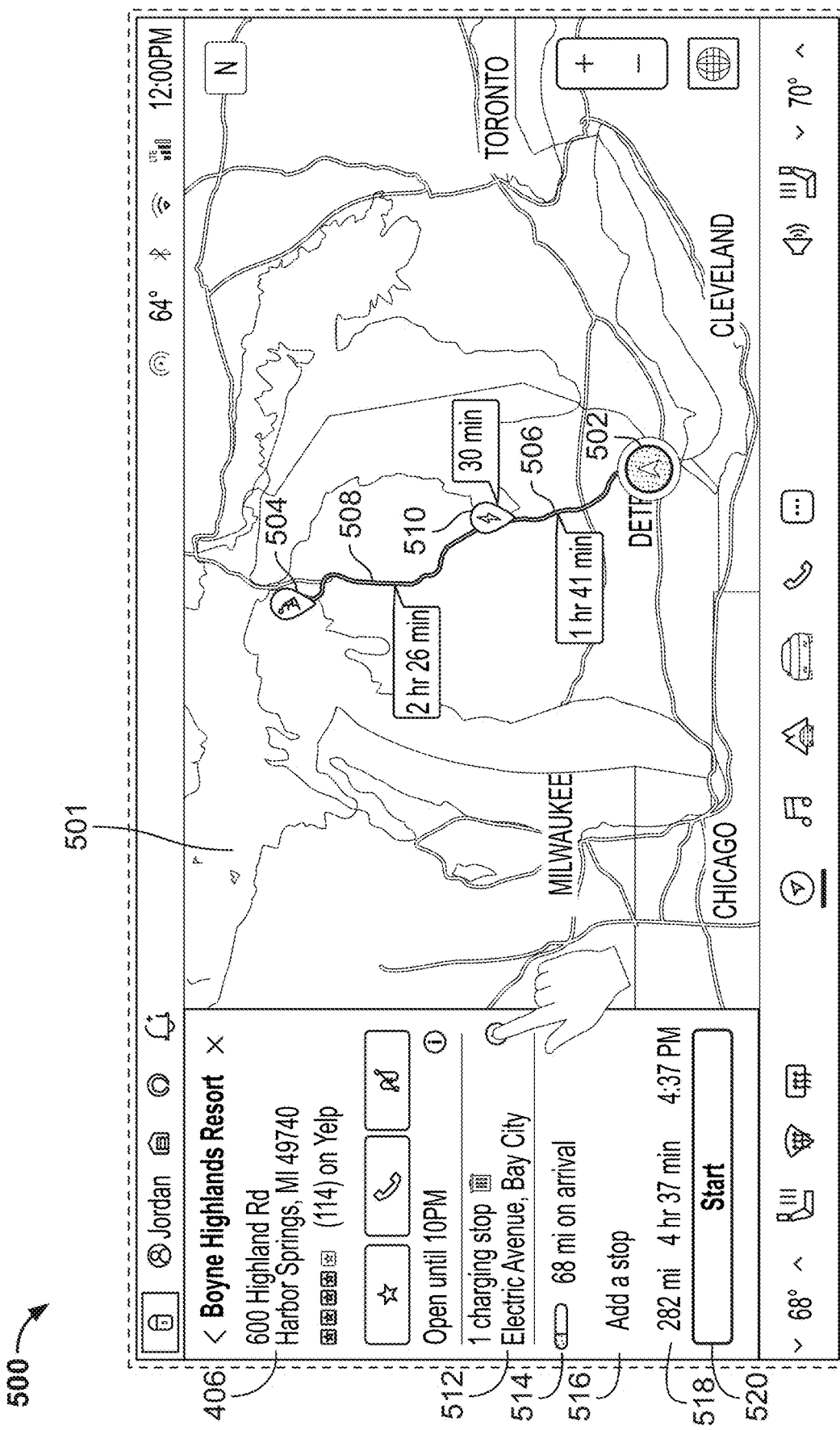
FIG. 5 shows an exemplary navigation interface for navigating to a destination, in accordance with some embodiments of the present disclosure.

FIG. 5 shows an exemplary navigation interface 500 for navigating to destination 406, in accordance with some embodiments of the present disclosure. As shown, navigation interface 500 may comprise a suggested route from indicator 502 of the current location of electric vehicle 101 to indicator 504 of destination 406. The suggested route may include first route portion 506 from the current location of the electric vehicle to indicator 510 of suggested charging station 512 and a second route portion 508 from suggested charging station 512 to indicator 504 of destination 406.

Processing circuitry 102 may identify suggested charging station 512 based on the event identified in the schedule of driver 212 that is scheduled during an estimated travel period to reach destination 406. Processing circuitry 102 may estimate the travel period to reach destination 406 based on factors that affect travel speed (e.g., driving habits of driver 212, traffic along the suggested route, the speed limit along the suggested route, etc.). For example, as shown, processing circuitry 102 may estimate the travel period as four hours and seven minutes (e.g., the combined time of first route portion 506 and second route portion 508) (e.g., from 12:00 PM to 4:07 PM without any stops). Processing circuitry 102 may adjust the estimated travel period by the required charging time of electric vehicle 101. Based on this estimated travel period, processing circuitry 102 may analyze calendar data 300 of driver 212 to identify events scheduled during this travel period. For example, returning to FIG. 3, processing circuitry 102 may identify first event 302 and second event 304 scheduled during the estimated travel period. Processing circuitry 102 may analyze the identified events to determine if driver 212 is likely to stop for any of the identified events, based on the type of identified event. For example, processing circuitry 102 may determine that driver 212 is likely to stop for first event 302 (a "Zoom call with work"), but not likely to stop for second event 304 (a "call with doctor"). In response to determining that driver 212 is likely to stop for first event 302, processing circuitry 102 may estimate a location of electric vehicle 101 along the suggested route at a start time of first event 302 ("1:45 PM"). Processing circuitry 102 may then identify a charging station (e.g., charging station 512) at this estimated location to suggest to driver 212. As shown, indicator 510 representing suggested charging station 512 may be displayed on map interface 501 of navigation interface 500, along with a suggested charging time ("30 mins"). In some embodiments, the suggested charging time is based on the scheduled length of the identified event (e.g., first event 302), along with a location of charging station 512. For example, processing circuitry 102 may suggest a charging station that electric vehicle 101 can arrive at before the start time of the identified event. In some embodiments, if multiple charging stations are available, processing circuitry 102 may select charging station 512 based on secondary factors such as charging attributes of available charging stations, the duration of the scheduled event, availability of charging spots at the charging station, etc. In some embodiments, if processing circuitry 102 determines that electric vehicle 101 does not have sufficient range to reach charging station 512, processing circuitry 102 may suggest an intermediate charging station to quickly charge electric vehicle 101 to extend the range of electric vehicle 101 to reach charging station 512. In some embodiments, if processing circuitry 102 identifies multiple events where driver 212 is likely to stop, processing circuitry 102 may identify and suggest multiple suggested charging stations. For example, if processing circuitry 102 determined that driver 212 was likely to stop for second event 304, processing circuitry 102 could estimate a location of the electric vehicle along the suggested route at a start time of second event 304 ("3:00 PM") and identify a second charging station to suggest to driver 212.

In some embodiments, navigation interface 500 may display a selectable icon representing charging station 512, an estimated range 514 of electric vehicle 101 upon reaching destination 406, a selectable option 516 for adding a stop (e.g., a waypoint), general information 518 about the route (e.g., miles, total travel time, arrival time, etc.), and a selectable option 520 to start the trip.

In response to a user selection of selectable option 516, a search interface similar to the search interface shown in FIG. 2 or FIG. 4 may be generated for display, by way of processing circuitry 102 and output circuitry 120. In response to receiving an additional stop, processing circuitry 102 may recalculate the suggested route. For example, a user may enter a restaurant as a destination to stop for lunch as a waypoint. In some embodiments, in response to identifying a charging station at the additional stop, processing circuitry may additionally suggest the identified charging station to the driver 212 (e.g., to charge electric vehicle 212 while they eat lunch).

Figure 6:
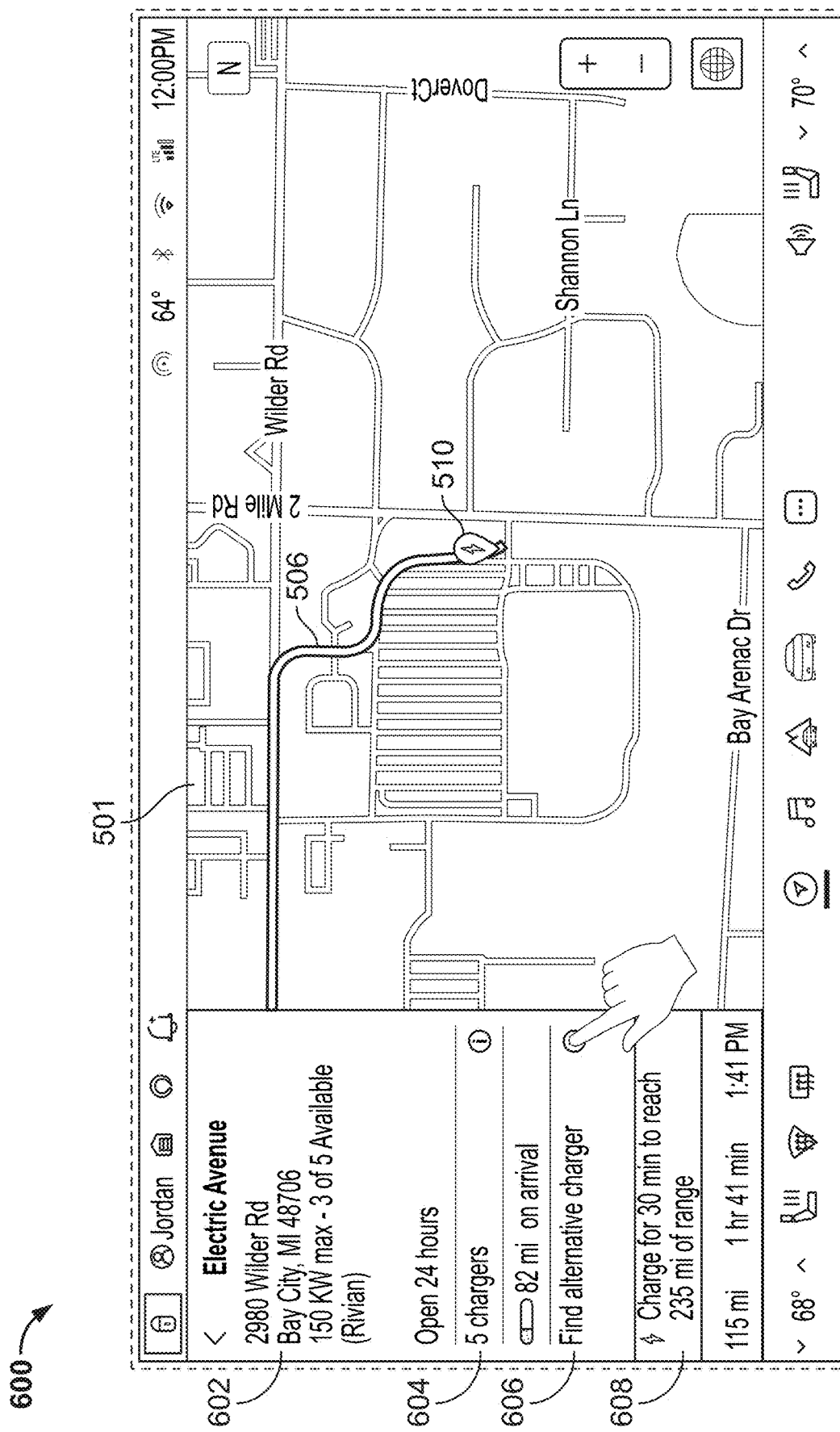
FIG. 6 shows an exemplary charging station interface for viewing or changing a suggested charging station, in accordance with some embodiments of the present disclosure.

In response to a user selection of selectable icon 510 representing charging station 512, charging station interface 600 may be generated for display, by way of processing circuitry 102 and output circuitry 120, at an in-vehicle infotainment screen of display 130 (e.g., a heads-up display and/or at one or more dashboard displays depicting graphical user interfaces) and/or at a display of user device 138 of driver 212 of electric vehicle 101, as shown in FIG. 6.

FIG. 6 shows an exemplary charging station interface 600 for viewing or changing a suggested charging station (e.g., charging station 512), in accordance with some embodiments of the present disclosure. As shown, indicator 510 representing suggested charging station 512 may be displayed on a zoomed-in portion of map interface 501 of navigation interface 600, along a portion of first route portion 506. Charging station interface 600 may comprise information 602 about charging station 512 (e.g., address, power level, number of currently available charging spots, operating hours), charging spots information 604 of charging station 512, a selectable option 606 for finding an alternative charging station, and trip and charge information 608. In response to a user selection of selectable option 606, alternative charging station selection interface 700 may be generated for display, by way of processing circuitry 102 and output circuitry 120, at an in-vehicle infotainment screen of display 130 (e.g., a heads-up display and/or at one or more dashboard displays depicting graphical user interfaces) and/or at a display of user device 138 of driver 212 of electric vehicle 101, as shown in FIG. 7.

Figure 7:
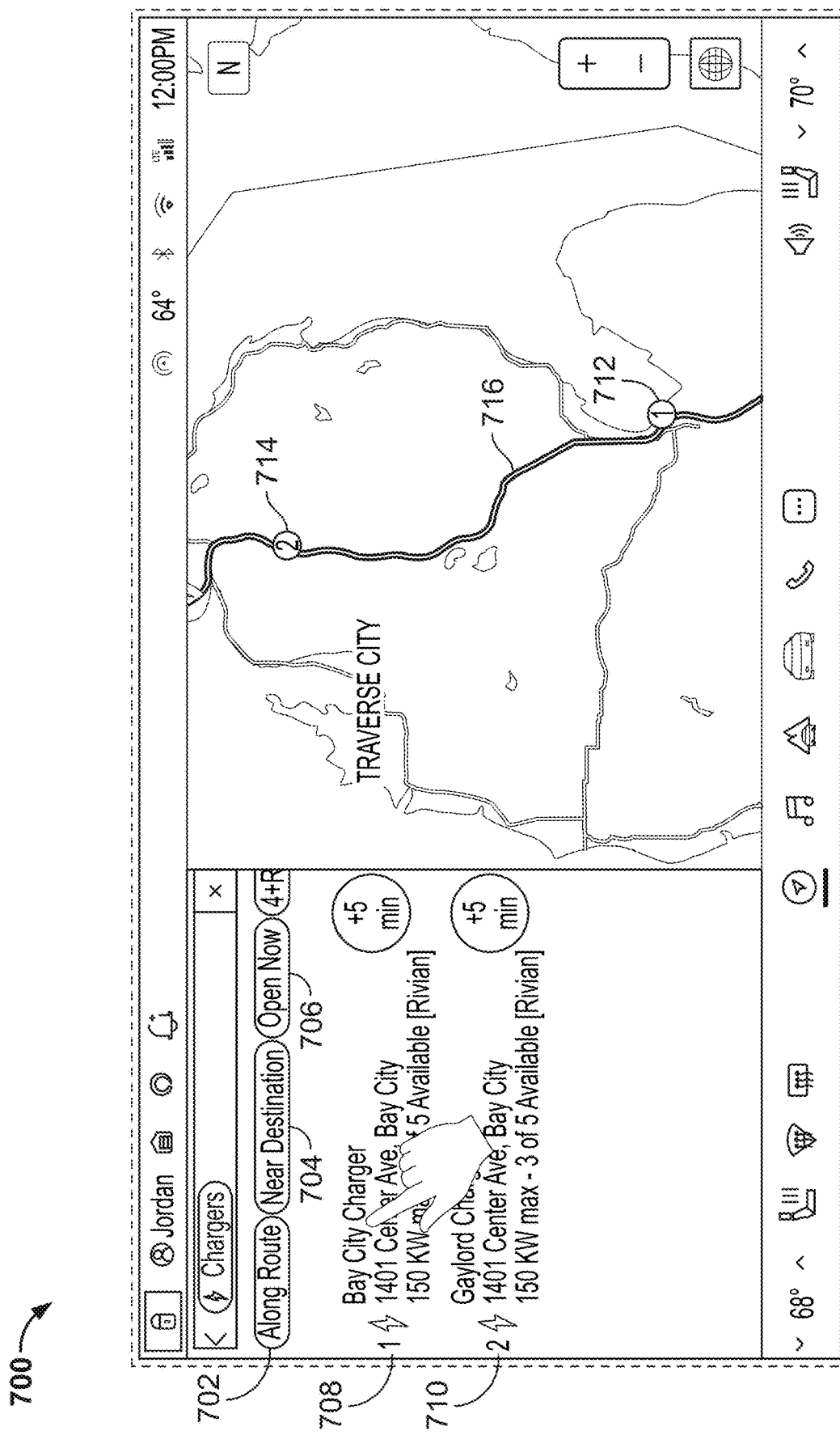
FIG. 7 shows an exemplary alternative charging station selection interface for selecting an alternative charging station, in accordance with some embodiments of the present disclosure.

FIG. 7 shows an exemplary alternative charging station selection interface 700 for selecting an alternative charging station, in accordance with some embodiments of the present disclosure. As shown, alternative charging station selection interface 700 may comprise one or more filters 702, 704, 706 (e.g., "Along Route," "Near Destination," "Open Now"). In response to a user selecting one of the one or more filters 702, 704, 706, processing circuitry 102 may identify and generate for display the corresponding charging stations. For example, in response to a user selecting filter 702 (e.g., "Along Route"), processing circuitry 102 may identify and display charging stations along the suggested route. In response to a user selecting filter 704 ("Near Destination"), processing circuitry 102 may identify and display charging stations near the destination. As shown, in response to a user selecting filter 706 (e.g., "Open Now"), processing circuitry 102 may identify a first alternative charging station 708 and a second alternative charging station 710. As shown, alternative charging station selection interface 700 may display icons 712 and 714, respectively corresponding to the first and second alternative charging stations 708, 710 along with the suggested route 716 (e.g., corresponding to first route portion 506 and/or second route portion 508). In response to a user selecting one of the first and second alternative charging stations 708, 710, suggested charging station 512 may be replaced with the selected alternative charging station. For example, in response to a user selecting the first alternative charging station 708, suggested charging station 512 (e.g., as shown in FIG. 5) is replaced with alternative charging station 708, as shown in FIG. 8.

Figure 8:
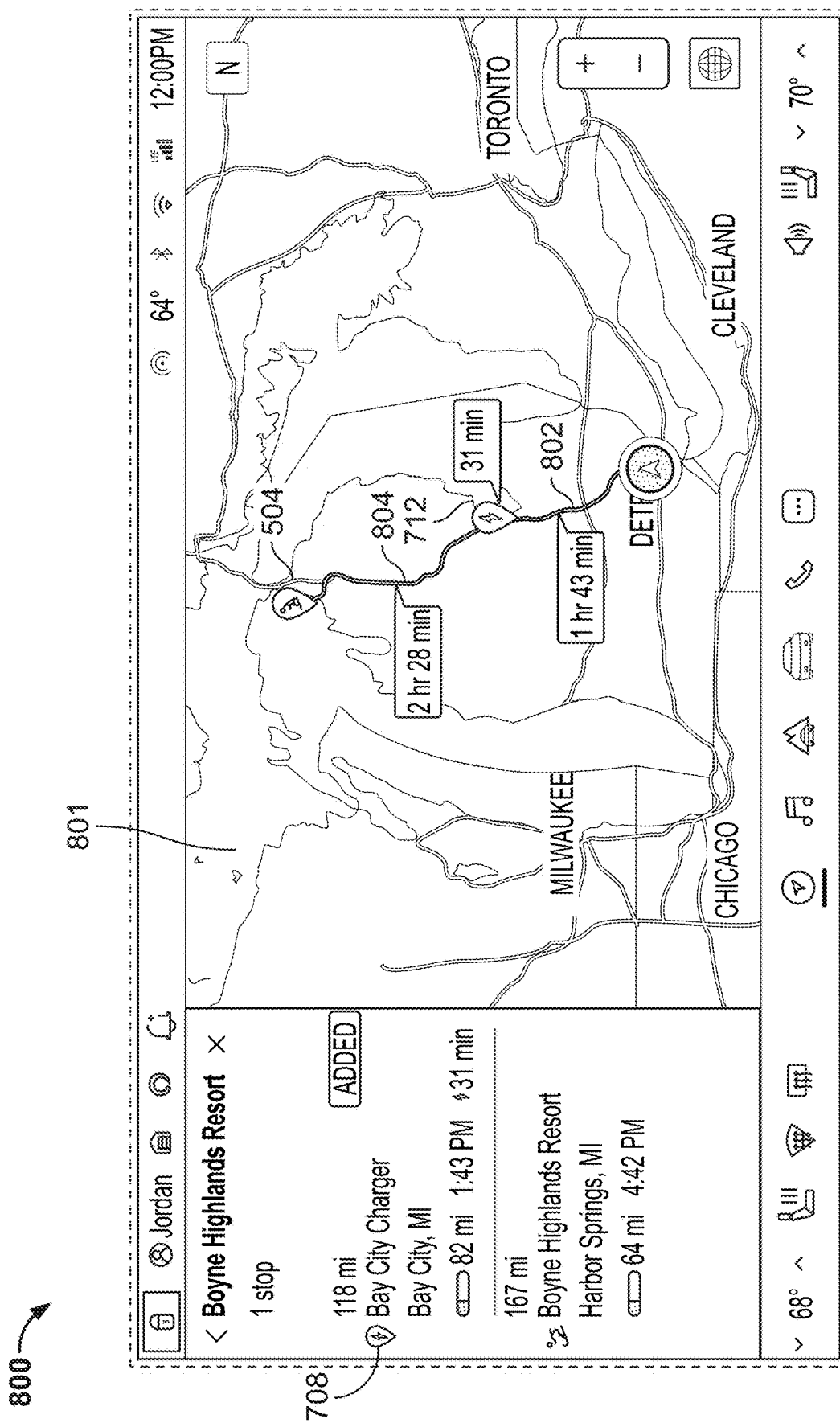
FIG. 8 shows an exemplary modified navigation interface for navigating to a destination, in accordance with some embodiments of the present disclosure.

FIG. 8 shows an exemplary modified navigation interface 800 for navigating to destination 406, in accordance with some embodiments of the present disclosure. As shown, modified navigation interface 800 corresponds to navigation interface 500, except that suggested charging station 512 has been replaced with first alternative charging station 708. For example, icon 712, representing first alternative charging station 708, may be displayed on modified map interface 801 of modified navigation interface 800. Additionally, the suggested route to destination 406 (illustrated by indicator 504) may be updated, and the modified first route portion 802 to indicator 712 of first alternative charging station 708 and the modified second route portion 804 from first alternative charging station 708 to indicator 504 of destination 406 may be displayed in modified navigation interface 800.

In some embodiments, it may be advantageous to suggest additional charging stations to driver 212 along the suggested route to a destination. For example, processing circuitry 102 may access a profile of driver 212 and predict a location along a route to the destination where driver 212 is likely to stop based on their profile (e.g., stopover frequency). For example, if driver 212 typically stops every hour to stretch or take a bathroom break, processing circuitry 102 may suggest additional charging stations at approximately every hour along the suggested route. In some embodiments, processing circuitry 102 may monitor the behavior of driver 212 over time to determine locations or time intervals when driver 212 typically stops. For example, processing circuitry 102 may monitor the behavior of driver 212 using image sensor 128 (e.g., via sensor interface 118), input interface 122 (e.g., via input circuitry 116), etc., to build the profile of driver 212. In some embodiments, if driver 212 is traveling to a destination that does not include any nearby charging stations, it may be advantageous to suggest the last charging station along the route to the destination as an additional charging station so that electric vehicle 101 arrives at the destination with sufficient charge to drive around at the destination and reach the next charging station (e.g., on the return trip). Similarly, if there are no fast-charging stations at the destination, it may be advantageous to suggest the last fast-charging station along the route to the destination as an additional charging station.

Figure 9:
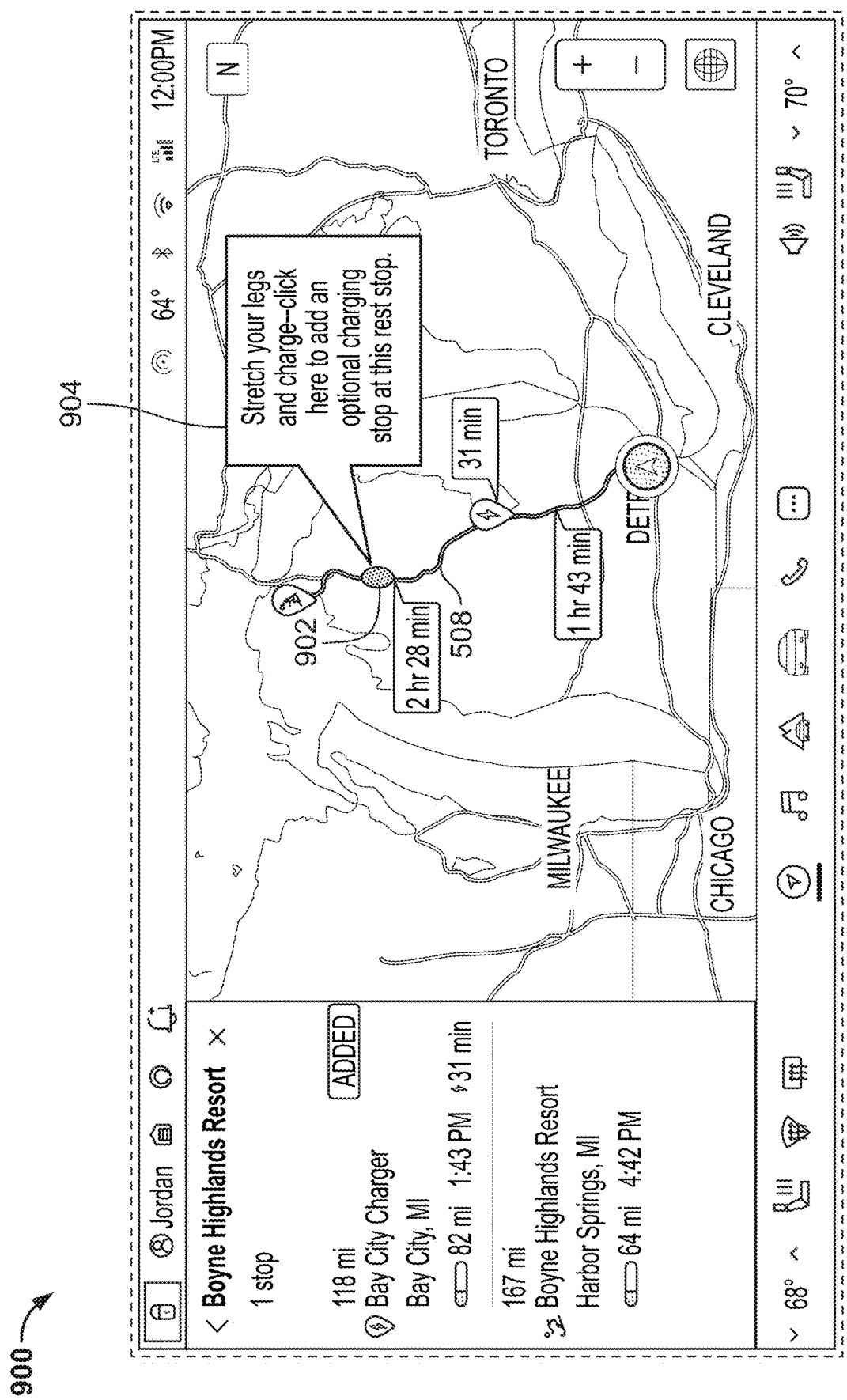
FIG. 9 shows an exemplary navigation interface for adding an additional charging stop along the suggested route for navigating to a destination, in accordance with some embodiments of the present disclosure.

FIG. 9 shows an exemplary navigation interface 900 for adding an additional charging stop along the suggested route for navigating to destination 406, in accordance with some embodiments of the present disclosure. For example, as shown, in response to determining that driver 212 typically stops every hour on longer trips (e.g., to stretch), processing circuitry 102 may identify an additional charging station 902 at a midway point of second route portion 508. In some embodiments, navigation interface 900 may also comprise a message 904 suggesting that driver 212 stretch their legs and charge with an option to add additional charging station 902. In response to a user selection of message 904, processing circuitry 102 may update the suggested route to add the additional charging station 902.

In some embodiments, it may be advantageous to monitor the weather at a suggested charging station and suggest an alternative charging station if inclement weather is detected. For example, processing circuitry 102 may access a hyperlocal forecast at a location of the suggested charging station from one or more servers 140 (e.g., via communications circuitry 136) when electric vehicle 101 is within a predetermined range or estimated travel time to the suggested charging station. If inclement weather is detected at the suggested charging station, processing circuitry 102 may search for an alternative charging station that is not experiencing inclement weather.

Figure 10:
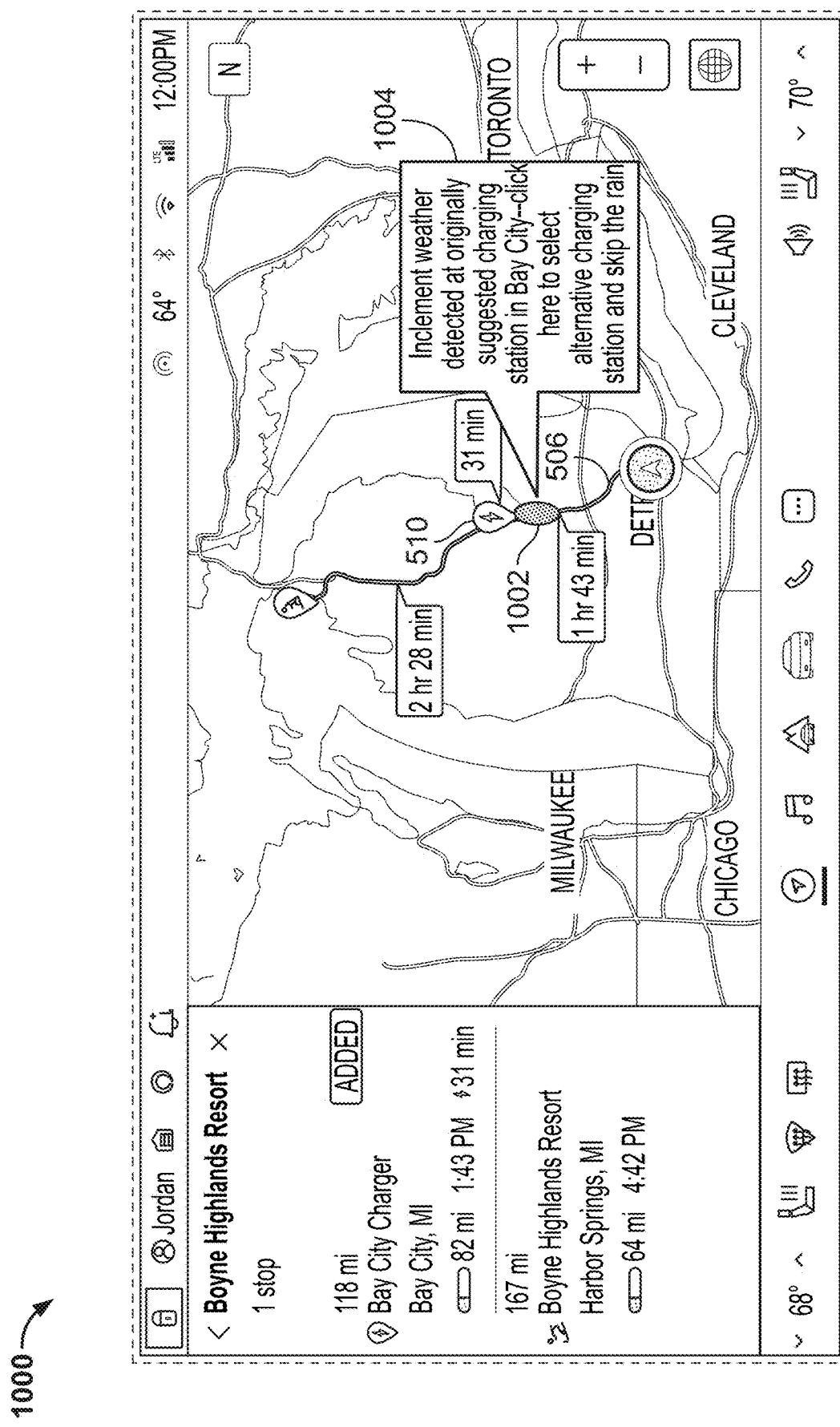
FIG. 10 shows an exemplary navigation interface for suggesting an alternative charging station along the suggested route for navigating to a destination, in accordance with some embodiments of the present disclosure.

FIG. 10 shows an exemplary navigation interface 1000 for suggesting an alternative charging station along the suggested route for navigating to destination 406, in accordance with some embodiments of the present disclosure. For example, as shown, in response to detecting inclement weather at a location of suggested charging station 512 (shown by indicator 510), processing circuitry 102 may identify an alternative charging station 1002 that is not subject to inclement weather. As shown, alternative charging station 1002 is located along first route portion 506 so that driver 212 may arrive at the alternative charging station 1002 before the start time of first event 302 (as discussed above in relation to FIG. 5), while avoiding inclement weather.

Figure 11:
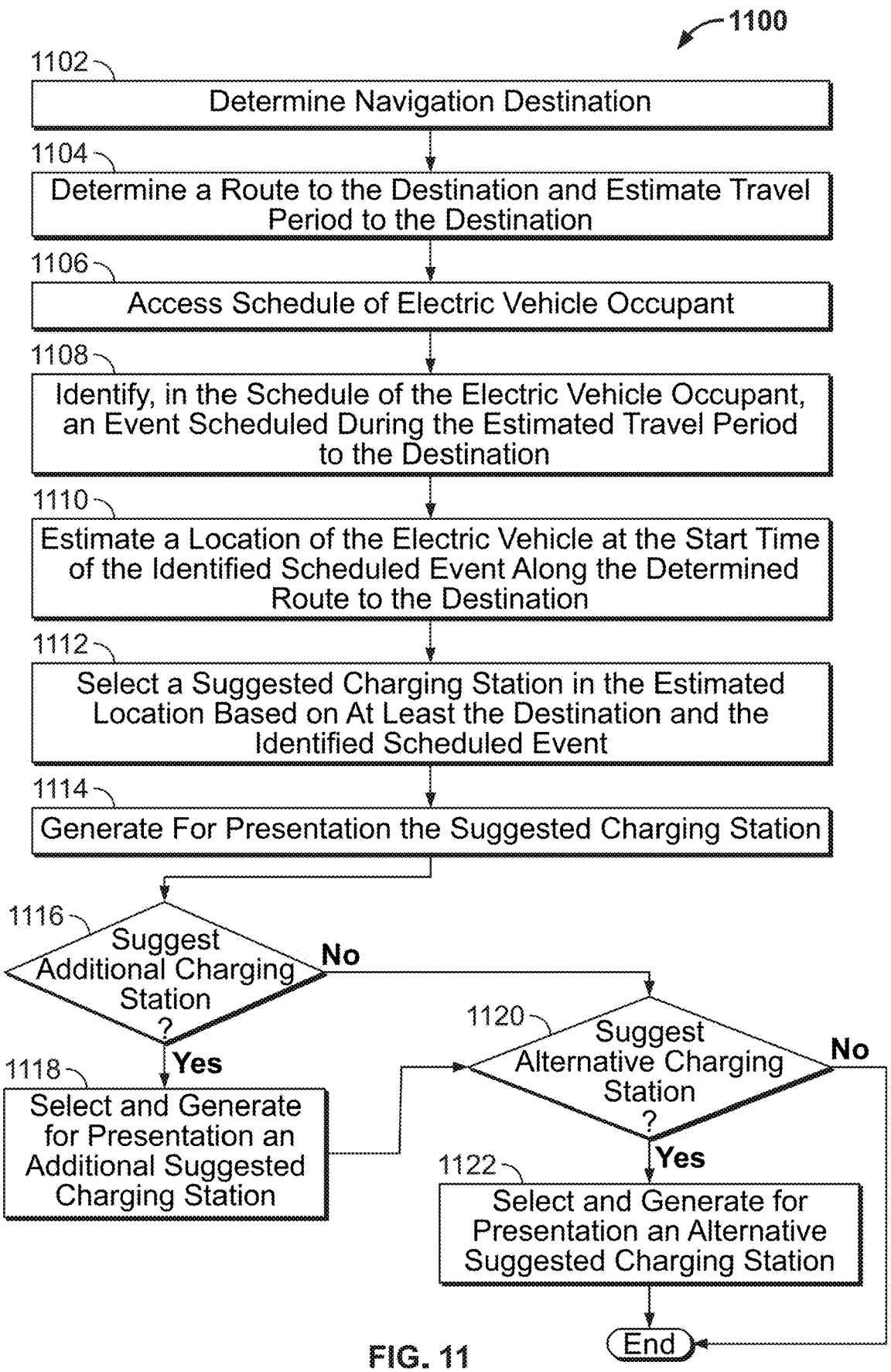
FIG. 11 shows a flowchart of an illustrative process for suggesting a charging station for an electric vehicle, in accordance with some embodiments of the present disclosure.

FIG. 11 shows a flowchart of an illustrative process 1100 for suggesting a charging station for an electric vehicle, in accordance with some embodiments of the present disclosure. Process 1100 may be performed at least in part by processing circuitry 102 and/or user device 138.

At 1102, processing circuitry 102 may determine a navigation destination. For example, input circuitry 116 may receive a user selection of a suggested destination on navigation interface 200 or a user input of a destination on search interface 400. Navigation interface 200 and search interface 400 may be displayed at display 130 of electric vehicle 101 and/or at user device 138.

At 1104, processing circuitry 102 may determine a route to the destination and estimate a travel period to the destination. In some embodiments, processing circuitry 102 may perform this determination and estimation based on information received from GPS system 134 and/or one or more servers 140.

At 1106, processing circuitry 102 and/or communications circuitry 136 may access a schedule of an occupant of electric vehicle 101 (e.g., driver 212). In some embodiments, processing circuitry 102 may retrieve this information from user device 138. In some embodiments, the schedule may be a schedule associated with the electric vehicle 101.

At 1108, processing circuitry 102 may identify, in the schedule of the occupant, an event scheduled during the estimated travel period to the destination. For example, processing circuitry 102 may analyze the schedule to identify an event where the occupant of electric vehicle 101 is likely to stop driving during the event (e.g., during a scheduled video call).

At 1110, processing circuitry 102 may estimate the location of electric vehicle 101 at the start time of the identified scheduled event along the determined route to the destination. For example, processing circuitry 102 may analyze the driving habits of driver 212 of electric vehicle 101, traffic along the determined route, the speed limit along the determined route, etc., to estimate the location of electric vehicle 101 at the start time of the identified scheduled event. It should be noted that processing circuitry 102 for analyzing the driving habits may be deactivated or simply turned off based on driver/user preferences and for example, processing circuitry 102 may be deactivated or turned off initially unless activated or turned on by the driver.

At 1112, processing circuitry 102 may select a suggested charging station in the estimated location based on at least the destination and the identified scheduled event. For example, processing circuitry 102 may select the suggested charging station among a plurality of available charging stations around the estimated location. In some embodiments, processing circuitry 102 may also select the suggested charging station based on a charge state of electric vehicle 101, a duration of the identified scheduled event, or charging attributes of available charging stations. For example, if the duration of the identified scheduled event is long, processing circuitry 102 may select a slower, cheaper charging station. On the other hand, if the duration of the identified scheduled event is short, processing circuitry 102 may select a faster, more expensive charging station. In some embodiments, processing circuitry 102 may select a suggested charging station based in part on charging station health or charging station utilization.

At 1114, processing circuitry 102 may generate for presentation the suggested charging station (e.g., suggested charging station 512 on navigation interface 500). Navigation interface 500 (or any of the other interfaces described above) may be displayed at display 130 of electric vehicle 101 and/or at user device 138.

At 1116, processing circuitry 102 may determine whether to suggest an additional charging station. For example, as described in more detail in connection with FIG. 12, processing circuitry 102 may determine whether to add an additional charging station based on, e.g., an added waypoint, predicted behavior of driver 212, charge level of electric vehicle 101, etc. In the case that an additional charging station is not suggested, processing may proceed to 1120. Otherwise ("Yes" at 1116), processing may proceed to 1118.

At 1118, processing circuitry 102 may select and generate for presentation an additional suggested charging station (e.g., additional suggested charging station 902 on navigation interface 900). Navigation interface 900 (or any of the other interfaces described above) may be displayed at display 130 of electric vehicle 101 and/or at user device 138.

At 1120, processing circuitry 102 may determine whether to suggest an alternative charging station. For example, as described in more detail in connection with FIG. 13, processing circuitry 102 may determine whether to suggest an alternative charging station based on, e.g., inclement weather at the location of the originally suggested charging station. In the case that an alternative charging station is not suggested, processing may end. Otherwise ("Yes" at 1120), processing may proceed to 1122.

At 1122, processing circuitry 102 may select and generate for presentation an alternative suggested charging station (e.g., alternative charging station 1002 on navigation interface 1000). Navigation interface 1000 (or any of the other interfaces described above) may be displayed at display 130 of electric vehicle 101 and/or at user device 138.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, in some implementations, steps 1116, 1118, 1120, and/or 1122 can be omitted. In some implementation, step 1120 may be utilized for any destination/waypoint selected using any technique, etc. In some implementations, steps 1108-1114 may be repeated to identify a second suggested charging station (e.g., in response to identifying multiple events where electric vehicle 101 is likely to stop during the estimated travel period to the destination).

Figure 12:
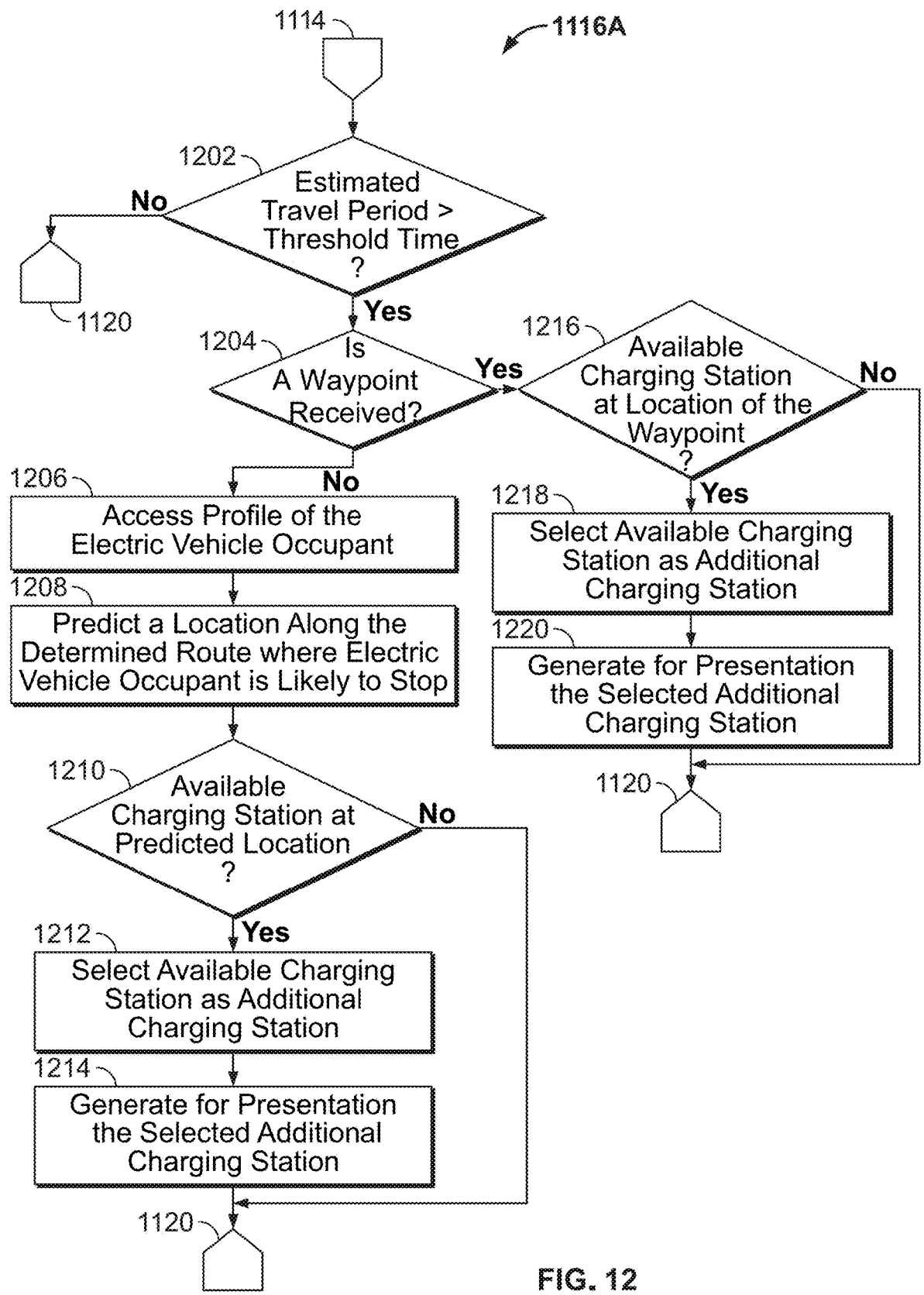
FIG. 12 shows a flowchart of an illustrative process for determining whether to suggest an additional charging station for the electric vehicle, in accordance with some embodiments of the present disclosure.

FIG. 12 shows a flowchart of an illustrative process 1116A for determining whether to suggest an additional charging station for electric vehicle 101, in accordance with some embodiments of the present disclosure. Process 1116A is one embodiment of a method for performing steps 1116 and 1118 of FIG. 11 and begins after step 1114. Process 1116A may be performed at least in part by processing circuitry 102 and/or user device 138.

At 1202, processing circuitry 102 may determine whether the estimated travel period is greater than a threshold time. For example, processing circuitry 102 may determine whether the estimated travel period is long enough to warrant suggesting additional charging stations. In some embodiments, the threshold time is set based on, e.g., a range of electric vehicle 101 or a historic stopping frequency of driver 212. For example, if the range of electric vehicle 101 is low or driver 212 frequently makes stops, the threshold time may be lowered from a predetermined threshold time (e.g., two hours). In the case that the estimated travel period is not greater than the threshold time, processing may proceed to 1120. Otherwise ("Yes" at 1202), processing may proceed to 1204.

At 1204, processing circuitry 102 may determine if a waypoint has been received from an occupant of electric vehicle 101 (e.g., via input interface 122). In the case that a waypoint has been received, processing may proceed to 1216. Otherwise ("No" at 1204), processing may proceed to 1206.

At 1206, processing circuitry 102 and/or communications circuitry 136 may access a profile of an occupant of electric vehicle 101 (e.g., driver 212). In some embodiments, processing circuitry 102 may retrieve this information from user device 138. In some embodiments, processing circuitry 102 may generate the profile by monitoring the occupant over time.

At 1208, processing circuitry 102 may analyze the accessed profile of the occupant of electric vehicle 101 to predict a location along the determined route where the occupant is likely to stop. For example, processing circuitry 102 may analyze locations at which the occupant often stops (e.g., rest stops) or time periods between stops (e.g., every hour).

At 1210, processing circuitry 102 may determine if there is an available charging station at the predicted location (e.g., open with available charging ports). In the case that there is not an available charging station at the predicted location, processing may proceed to 1120.

Otherwise ("Yes" at 1210), processing may proceed to 1212.

At 1212, processing circuitry 102 may select the available charging station as an additional charging station. In the case where multiple charging stations are available, processing circuitry 102 may select the additional charging station based on, e.g., charging attributes of available charging stations.

At 1214, processing circuitry 102 may generate for presentation a selected additional suggested charging station (e.g., additional suggested charging station 902 on navigation interface 900). Processing may then proceed to 1120.

Referring back to 1204, in the case where a waypoint is received, processing may proceed to 1216. At 1216, processing circuitry 102 may determine if there is an available charging station at the location of the waypoint (e.g., open with available charging ports). In the case that there is not an available charging station at the location of the waypoint, processing may proceed to 1120. Otherwise ("Yes" at 1210), processing may proceed to 1218.

At 1218, processing circuitry 102 may select the available charging station as an additional charging station. In the case where multiple charging stations are available, processing circuitry 102 may select the additional charging station based on, e.g., charging attributes of available charging stations.

At 1220, processing circuitry 102 may generate for presentation the selected additional suggested charging station (e.g., additional suggested charging station 902 on navigation interface 900) and then proceed to 1120.

Figure 13:
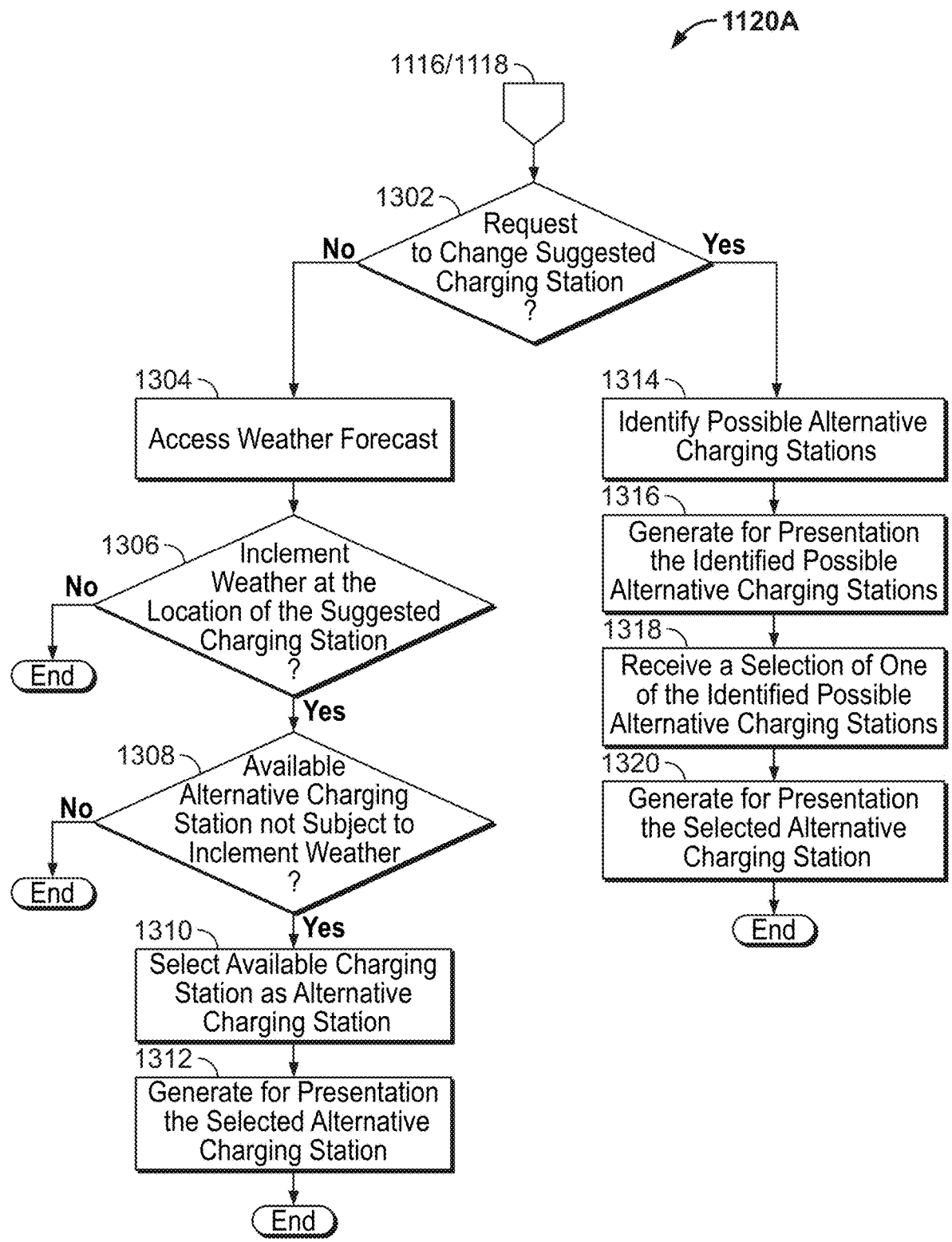
FIG. 13 shows a flowchart of an illustrative process for determining whether to suggest an alternative charging station for the electric vehicle, in accordance with some embodiments of the present disclosure.

FIG. 13 shows a flowchart of an illustrative process 1120A for determining whether to suggest an alternative charging station for electric vehicle 101, in accordance with some embodiments of the present disclosure. Process 1120A is one embodiment of a method for performing steps 1120 and 1122 of FIG. 11 and begins after step 1116 or 1118. Process 1120A may be performed at least in part by processing circuitry 102 and/or user device 138.

At 1302, processing circuitry 102 may determine if a request to change the suggested charging station has been received from an occupant of electric vehicle 101 (e.g., via input interface 122). In the case that a request has been received, processing may proceed to 1314. Otherwise ("No" at 1302), processing may proceed to 1304.

At 1304, processing circuitry 102 and/or communications circuitry 136 may access a weather forecast in the area around the determined route or the suggested charging station. For example, processing circuitry 102 and/or communications circuitry 136 may access a weather forecast at a zip code associated with a location associated with the suggested charging station or GPS coordinates of the location of the suggested charging station. In some embodiments, processing circuitry 102 may retrieve this information from user device 138 and/or one or more servers 140.

At 1306, processing circuitry 102 may determine if there is inclement weather at the location of the suggested charging station. For example, processing circuitry 102 may determine if there is weather that would make it uncomfortable for an occupant to get out of electric vehicle 101 to charge electric vehicle 101 (e.g., rain, wind, hail, snow, etc.).

In the case that no inclement weather is identified, processing may end. Otherwise ("Yes" at 1306), processing may proceed to 1308.

At 1308, processing circuitry 102 may determine if there is an alternative charging station available that is not subject to inclement weather and that electric vehicle 101 may reach before the identified scheduled event. In the case that no alternative charging station is available, processing may end. Otherwise ("Yes" at 1308), processing may proceed to 1310.

At 1310, processing circuitry 102 may select the available charging station as an alternative charging station. In the case where multiple charging stations are available, processing circuitry 102 may select the alternative charging station based on, e.g., charging attributes of available charging stations or user input.

At 1312, processing circuitry 102 may generate for presentation the selected alternative suggested charging station (e.g., alternative charging station 1002 on navigation interface 1000).

Referring back to 1302, in the case where a request to change the suggested charging station is received, processing may proceed to 1314. At 1314, processing circuitry 102 may identify possible alternative charging stations. For example, processing circuitry 102 may identify possible alternative charging stations within a predetermined range of the suggested charging station.

At 1316, processing circuitry 102 may generate for presentation the identified possible alternative charging stations (e.g., on alternative charging station selection interface 700).

At 1318, processing circuitry 102 may receive a user selection of one of the identified possible alternative charging stations (e.g., via input interface 122). In some embodiments, processing circuitry 102 may automatically select one of the identified possible charging stations without user input.

At 1320, processing circuitry 102 may generate for presentation the selected alternative suggested charging station (e.g., first alternative charging station 708 on modified navigation interface 800).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, steps 1304-1312 may be performed for any charging station stop, regardless of whether it was selected based on a user's schedule.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A system for suggesting a charging station for an electric vehicle, the system comprising:
   a display configured to display a navigation interface; and
   processing circuitry configured to:
   identify a user of the electric vehicle based on information obtained from a user device;
   determine a route from a current location of the electric vehicle to a destination, wherein the route includes a suggested charging station;
   generate for presentation the route on the navigation interface; and
   while traveling to the destination:
   access a schedule from the user device, the schedule comprising a plurality of future events populated by the user of the electric vehicle;
   identify, in the schedule, one of the future events as being a call event scheduled during a travel period to reach the destination;
   estimate a future location of the electric vehicle along the route to the destination at a start time of the identified call event based on a factor that affects a travel speed associated with the identified user of the electric vehicle;
   select an alternative charging station from a plurality of charging stations based at least on the future location and a projected arrival of the electric vehicle at the alternative charging station prior to the start time of the identified call event; and
   generate for presentation a modified route to the destination including the alternative charging station on the navigation interface.

2. The system of claim 1, wherein the processing circuitry is configured to select the alternative charging station based on one or more of a charge state of the electric vehicle, a duration of the identified call event, or charging attributes of available charging stations.

3. The system of claim 1, wherein the suggested charging station is a first suggested charging station, and
   wherein the processing circuitry is further configured to:
   access a profile of the user of the electric vehicle;
   predict a location along the route to the destination where the user is likely to stop based on the profile of the user;
   select a second suggested charging station based on the predicted location; and
   generate for presentation, at the display, the second suggested charging station.

4. The system of claim 1, wherein the processing circuitry is further configured to:
   access a weather forecast;
   identify inclement weather at a location of the suggested charging station based on the weather forecast while traveling to the destination; and
   in response to identifying the inclement weather at the location of the suggested charging station, select the alternative charging station further based on the weather forecast to avoid the identified inclement weather.

5. The system of claim 1, wherein the suggested charging station is a first suggested charging station, and
   wherein the processing circuitry is further configured to:
   receive a waypoint input from the user of the electric vehicle;
   select a second suggested charging station based on the waypoint; and
   generate for presentation, at the display, the second suggested charging station.

6. The system of claim 1, wherein the processing circuitry is further configured to:
   receive a request to replace the suggested charging station while traveling to the destination; and in response to receiving the request to replace the suggested charging station, select the alternative charging station along the route to the destination.

7. The system of claim 1, wherein the processing circuitry is further configured to:
access a profile of the user of the electric vehicle;
identify driving habits of the user based on the profile of the user;
access a traffic report along the route to the destination; and
estimate the travel period to reach the destination based the driving habits of the user and the traffic report.

8. The system of claim 1, wherein the identified call event is a first scheduled event, and
wherein the processing circuitry is configured to determine the destination by:
identifying, in the schedule of the user of the electric vehicle, a second scheduled event;
determining a location associated with the second scheduled event; and
determining the location associated with the second scheduled event as the destination.

9. The system of claim 1, wherein the processing circuitry is configured to generate for presentation the modified route to the destination including the alternative charging station on the navigation interface by:
generating for presentation an overlay on a map interface of the navigation interface, wherein the overlay comprises the alternative charging station.

10. A method for suggesting a charging station for an electric vehicle, the method comprising:
identifying a user of the electric vehicle based on information obtained from a user device;
determining a route from a current location of the electric vehicle to a destination, wherein the route includes a suggested charging station;
generating for presentation the route on a navigation interface of a display of the electric vehicle;
while the electric vehicle is traveling to the destination:
accessing a schedule from the user device, the schedule comprising a plurality of future events populated by the user of the electric vehicle;
identifying, in the schedule of the user, one of the future events as being a call event scheduled during a travel period to reach the destination;
estimating a future location of the electric vehicle along the route to the destination at a start time of the identified call event based on a factor that affects a travel speed associated with the identified user of the electric vehicle;
selecting an alternative charging station from a plurality of charging stations based at least on the future location and a projected arrival of the electric vehicle at the alternative charging station prior to the start time of the identified call event; and
generating for presentation a modified route to the destination including the alternative charging station on the navigation interface.

11. The method of claim 10, wherein the selecting the suggested charging station comprises selecting the alternative charging station based on one or more of a charge state of the electric vehicle, a duration of the identified call event, or charging attributes of available charging stations.

12. The method of claim 10, wherein the suggested charging station is a first suggested charging station, and wherein the method further comprises:
accessing a profile of the user;
predicting a location along the route to the destination where the user is likely to stop based on the profile of the user;
selecting a second suggested charging station based on the predicted location; and
generating for presentation, at the display, the second suggested charging station.

13. The method of claim 10, further comprising:
accessing a weather forecast;
identifying inclement weather at a location of the suggested charging station based on the weather forecast while the electric vehicle is traveling to the destination; and
in response to identifying the inclement weather at the location of the suggested charging station, selecting the alternative charging station further based on the weather forecast to avoid the identified inclement weather.

14. The method of claim 10, wherein the suggested charging station is a first suggested charging station, and wherein the method further comprises:
receiving a waypoint input from the user;
selecting a second suggested charging station based on the waypoint; and
generating for presentation, at the display, the second suggested charging station.

15. The method of claim 10, further comprising:
receiving a request to replace the suggested charging station while the electric vehicle is traveling to the destination; and
in response to receiving the request to replace the suggested charging station, selecting the alternative charging station along the route to the destination.

16. A non-transitory computer-readable medium having non-transitory computer-readable instructions encoded thereon that, when executed by a processor, causes the processor to:
identify a user of the electric vehicle based on information obtained from a user device;
determine a route from a current location of an electric vehicle to a destination, wherein the route includes a suggested charging station;
generate for presentation the route on a navigation interface of a display of the electric vehicle;
while the electric vehicle travels to the destination:
access a schedule from the user device, the schedule comprising a plurality of future events populated by the user of the electric vehicle;
identify one of the future events as being a call event scheduled during a travel period to reach the destination;
estimate a future location of the electric vehicle along the route to the destination at a start time of the identified call event based on a factor that affects a travel speed associated with the identified user of the electric vehicle;
select an alternative charging station from a plurality of charging stations based at least on the future location and a projected arrival of the electric vehicle at the alternative charging station prior to the start time of the identified call event; and
generate for presentation a modified route to the destination including the alternative charging station on the navigation interface.

17. The non-transitory computer-readable medium of claim 16, wherein the suggested charging station is a first suggested charging station, and wherein the instructions, when executed by the processor, further cause the processor to:
  access a profile of the user;
  predict a location along the route to the destination where the user is likely to stop based on the profile of the user;
  select a second suggested charging station based on the predicted location; and
  generate for presentation, at the display, the second suggested charging station.

18. The non-transitory computer-readable medium of claim 16, wherein the suggested charging station is a first suggested charging station, and
wherein the instructions, when executed by the processor, further cause the processor to:
  receive a waypoint input from the user;
  select a second suggested charging station based on the waypoint; and
  generate for presentation, at the display, the second suggested charging station.

19. The system of claim 1, wherein the processing circuitry is configured to generate for presentation the navigation interface comprising the modified route to the destination and an indicator of the alternative charging station.

20. The method of claim 10, wherein generating for presentation the alternative charging station comprises generating for presentation the navigation interface comprising the modified route to the destination and an indicator of the alternative charging station.

21. The system of claim 1, wherein the identified call event is a video call event.

* * * * *